J. A. FLYNN.
COMBINATION HEATING AND HOT WATER SYSTEM.
APPLICATION FILED AUG. 1, 1907.

921,604.

Patented May 11, 1909.

3 SHEETS—SHEET 1.

Witnesses:
H. L. Sprague
H. W. Bowen

Inventor:
James A. Flynn
by Chapin & Co.
Attorneys.

J. A. FLYNN.
COMBINATION HEATING AND HOT WATER SYSTEM.
APPLICATION FILED AUG. 1, 1907.

921,604.

Patented May 11, 1909.

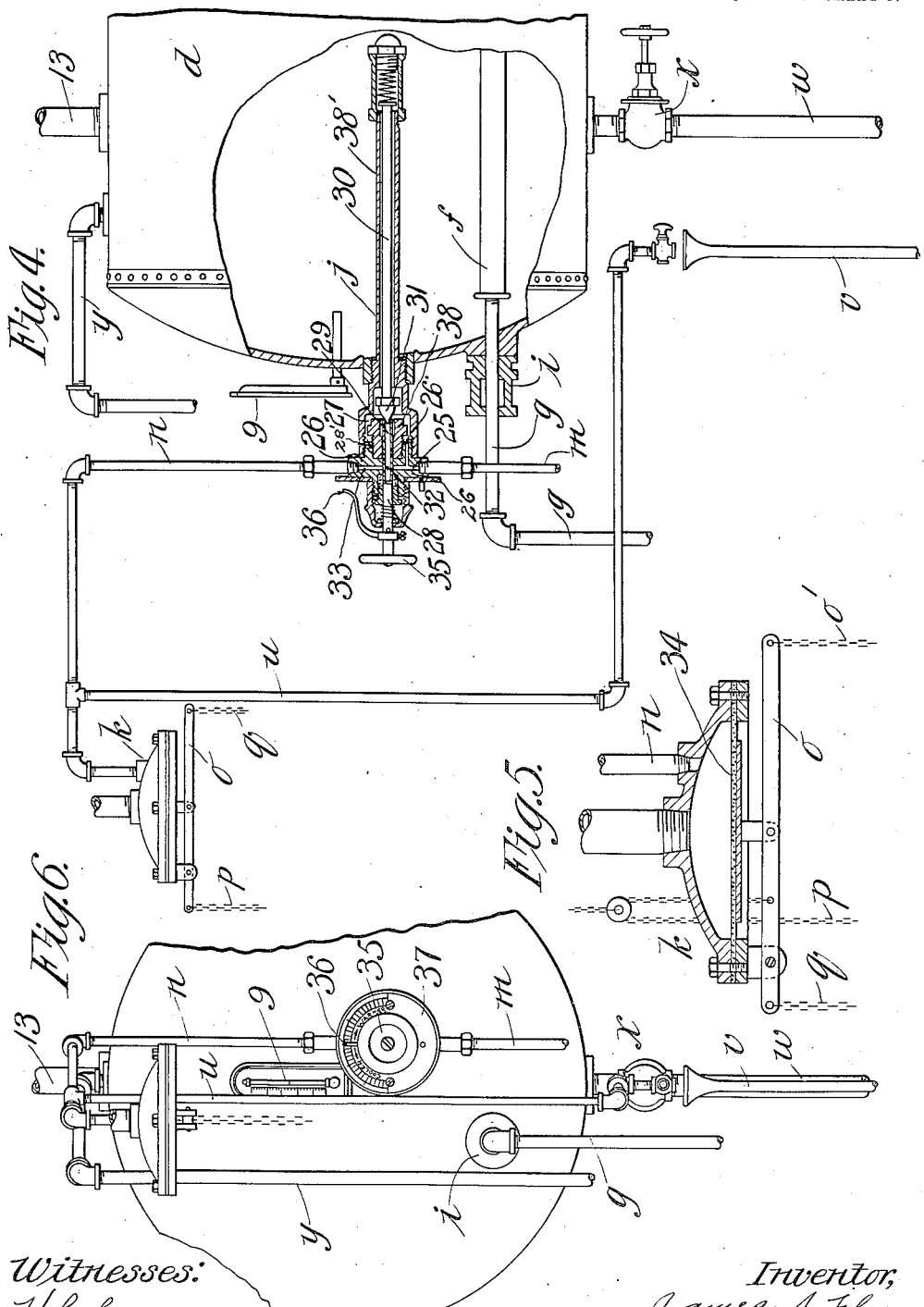

UNITED STATES PATENT OFFICE.

JAMES A. FLYNN, OF HOLYOKE, MASSACHUSETTS, ASSIGNOR TO DANIEL F. MORIARTY, OF HOLYOKE, MASSACHUSETTS.

COMBINATION HEATING AND HOT-WATER SYSTEM.

No. 921,604.        Specification of Letters Patent.        Patented May 11, 1909.

Application filed August 1, 1907. Serial No. 386,628.

*To all whom it may concern:*

Be it known that I, JAMES A. FLYNN, a citizen of the United States of America, residing at Holyoke, in the county of Hampden and State of Massachusetts, have invented new and useful Improvements in Combination Heating and Hot-Water Systems, of which the following is a specification.

This invention relates to a combined heating and hot water system whereby a suitable steam pressure is constantly maintained in the boiler of a steam fire engine, and at the same time a supply of hot water is provided as required for the various uses found necessary about engine houses.

The maintenance of a suitable steam pressure at all times in fire engine boilers is very important as it places the same in condition for immediate service when the engine is called out, this pressure being automatically maintained in the steamer by means of a thermostatic arrangement that controls the temperature of the water and consequently the steam pressure in the boiler. The thermostat also automatically controls a damper or draft regulating element whereby a steady rate of combustion is maintained. The necessary circulation of hot water in the heater, hot-water tank, and steamer is also automatically maintained by means of thermostatic arrangement. This circulation of hot water from the heater passes through a heating tube suitably located within a heating or hot water supply tank which is suitably connected to the city pressure whereby a supply of hot water is constantly maintained for the various purposes about an engine house as for cleaning and bathing purposes. The heating system is also automatically controlled whether the steamer is in the engine house or not; that is to say, the dampers on the heater are moved so that the rate of combustion varies in direct proportion to the requirements of the system.

As a modification of my invention, instead of having the heating tube for the hot water portion of my system pass through the hot water supply tank, I employ an "auxiliary heater" for receiving the heating tube, the auxiliary heater being connected with the ordinary house tank wherever the same is located in the building. The operations of this auxiliary heater are substantially the same as the one above referred to, since the pipe connections and arrangement of the thermostat are the same.

Figure 1:
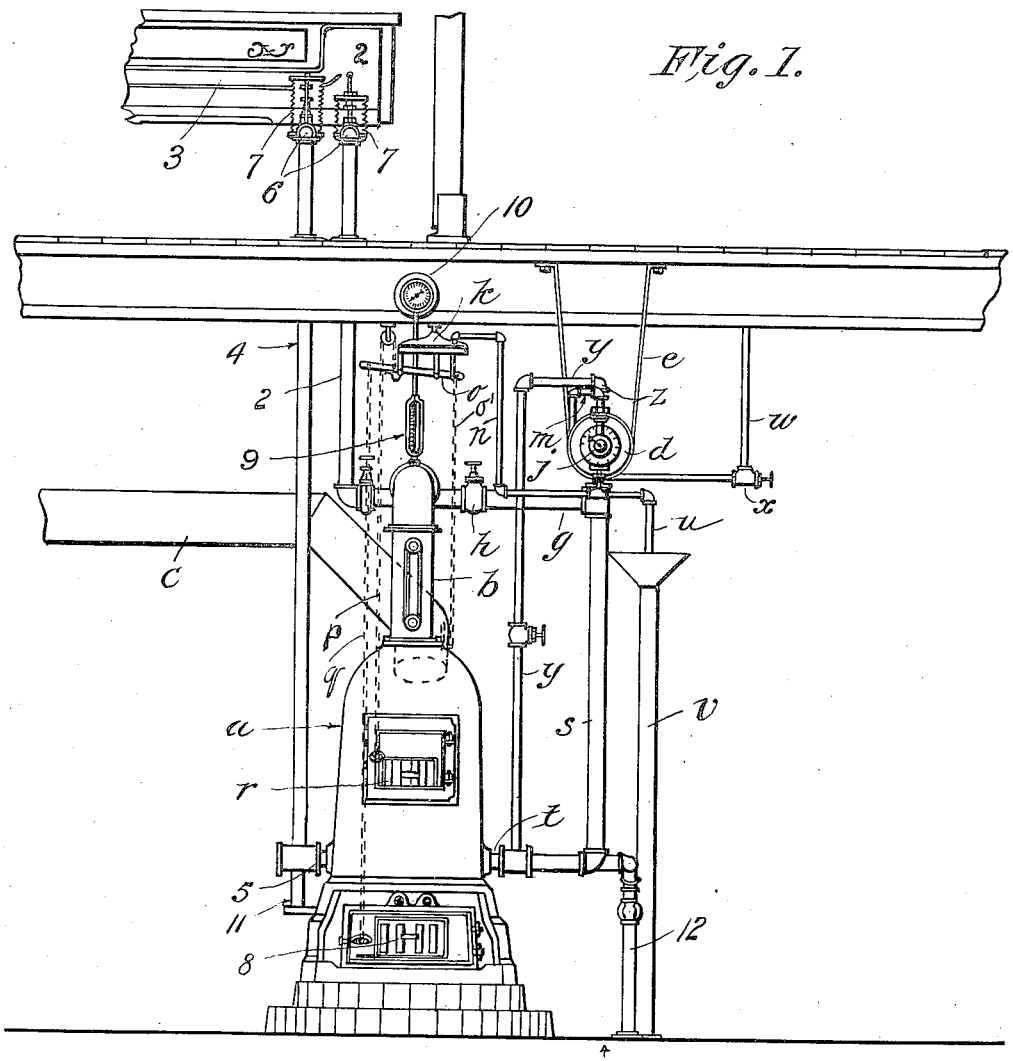
Figure 2:
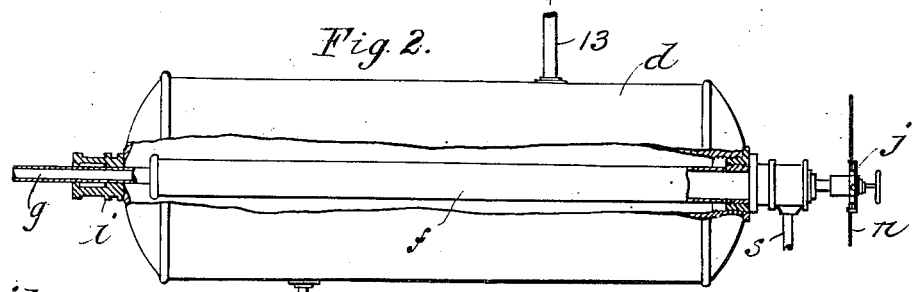
Figure 3:
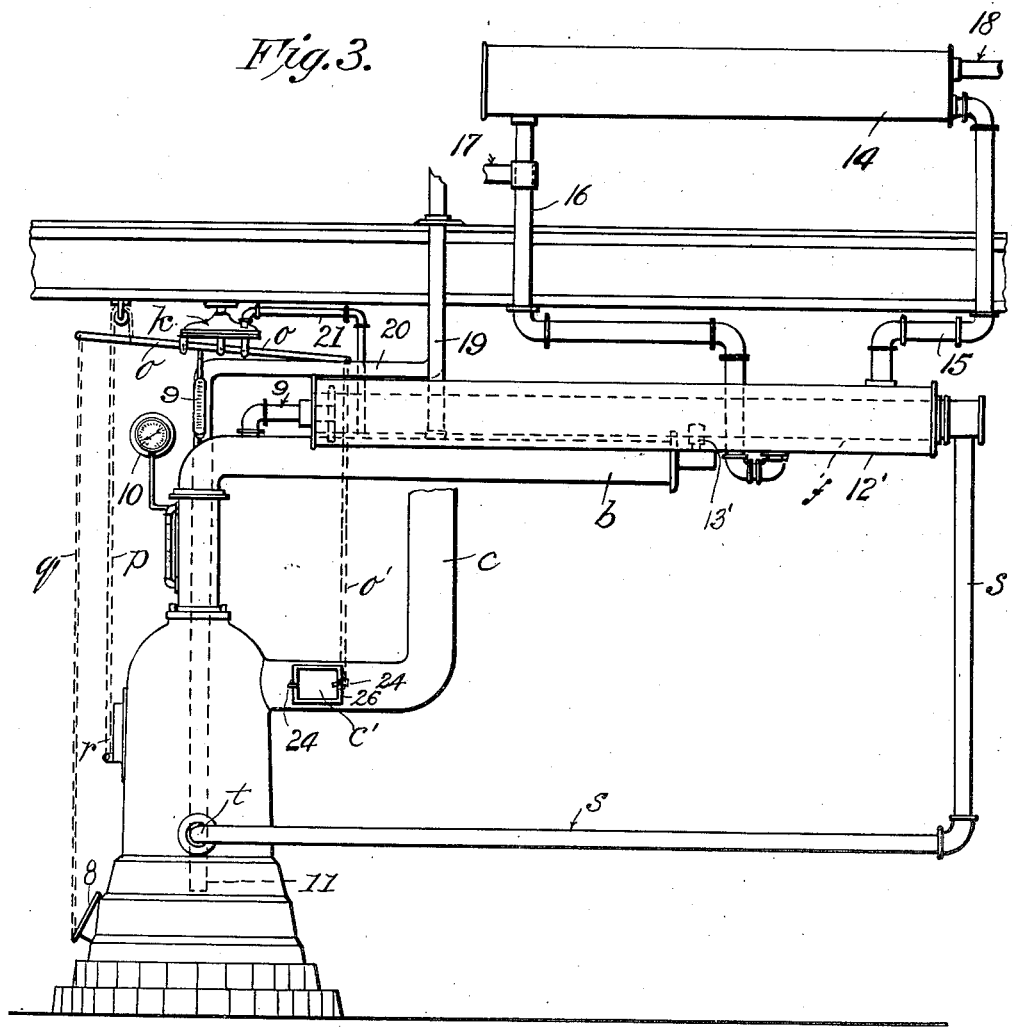

Referring to the drawings forming part of this application,—Figure 1 shows the combination system as a whole, the hot water supply tank being located adjacent the heater, and also showing the supply and return circulating pipes passing through the flooring to the steamer above and back to the heater. Fig. 2 is a detailed view of the construction of the hot water supply tank, and also showing in section the brass heating tube located therein. Fig. 3 is a general view of the combined heating and hot-water system showing a modification in which the hot water supply tank instead of being located adjacent the heater is already installed, or may be, in any convenient part of the building. In this system I employ an auxiliary heater that is suitably piped to the hot water tank, as hereinafter fully described. Fig. 4 is a detailed view showing the construction of the thermostatic valve. Fig. 5 is a detail sectional view of the diaphragm damper regulator. Fig. 6 is a front elevational view showing the thermostatic valve in end elevation.

Referring to the drawings in detail, *a* designates a heater of any approved construction of the hot water type; *b* designates the riser pipe mounted on the top of the heater for affording a suitable steam receptacle or dome, etc.; *c* is the smoke flue connected thereto for carrying off the products of combustion; *d* designates the hot water supply tank suitably supported in a horizontal position on the flooring above by means of the strap irons *e*.

*f* designates a brass heating or steam tube located within the hot water supply tank *d*, as clearly shown in Fig. 2. This heating tube is connected, by means of a steam supply pipe *g* that is connected at its other end, to the circulating pipe *b* and controlled by the valve *h*. A stuffing-box *i* is located at the left-hand end of the hot water tank *d* for forming a tight joint between the pipe *g* and the tank *d*.

At one right-hand end of the supply tank *d* is located a thermostatic valve *j* for maintaining the water in the heater, tank *d* and steamer at a constant temperature, as hereinafter described. This thermostatic valve is influenced by the steam passing through the heating tube *f* and controls the city supply which is connected above the diaphragm of the damper regulator, designated by the letter $k$. The city supply pipe $m$ is connected with the thermostatic valve $j$ while the pipe $n$ leads from the thermostat above the diaphragm $k$ of the damper-regulator, as shown in the detail view of Fig. 5. This damper regulator is of any ordinary approved construction and receives the city pressure from above, as shown, and operates the ordinary damper regulating lever $o$ to which are connected the upper and lower door-chains $p$ and $q$ for controlling the supply of air below and above the fire, as indicated by the reference characters $r$ and 8, also a chain $o^1$ is connected to the damper-lever $o$ and also to the pipe-damper $c^1$. A return pipe $s$ is connected to the steam heating tube $f$ adjacent the thermostat $j$ for completing the circulation of steam through the heating tube. This pipe leads back to the heater $a$ near the base of the same, as indicated at $t$.

$u$ designates a drip-pipe that is connected to the pipe $n$ for conveying the necessary leakage that occurs at the thermostatic valve $j$ to a pipe $v$ connected with the usual drainpipe.

$w$ designates a pipe connected with the city pressure for supplying cold water to the hot water tank $d$ and controlled by a valve $x$. This pipe simply replaces the amount of water that has been withdrawn from the tank $d$ for house purposes and permits the same to be heated after it enters the hot water supply tank $d$.

$y$ designates the water supply to the heater $a$ and is preferably connected to the upper side of the hot water tank $d$ as indicated by the letter $z$.

2 designates a pipe connected with the riser pipe $b$ for supplying steam of a suitable temperature and pressure but sufficiently high so that a suitable steam pressure is maintained in the boiler of the steamer which is designated as a whole by the numeral 3.

The steamer, or usual portable steam fire engine, which is designated by the numeral 3, is of the ordinary construction, as for example that shown in the patent to Hayes No. 517,572 dated April 3, 1894, and it is not considered necessary to show the steamer as a whole but only the usual pipes to which the supply and return pipes from the hot water heater are connected for maintaining the circulation of the water in the boiler of the steamer.

4 designates the return pipe from the steamer to the heater $a$ and is connected at the base portion thereof, as designated by the numeral 5.

The supply and return pipes 2 and 4 are connected to the steamer 3 by means of the valves 6 which are so arranged that when the steamer leaves the house these valves will be automatically closed by means of the springs 7. When this operation takes place, the temperature of the water in the heater $a$ necessarily rises a small amount, but in order to keep the temperature uniform, the thermostatic valve $j$ will be affected allowing the city pressure to flow through the pipe $m$ to the pipe $n$ and to the damper regulator $k$ actuating the damper lever $o$ thus closing the lower door 8 at the bottom of the heater and opening the upper door $r$ in the upper part of the heater, and at the same time opening the pipe damper as readily understood.

The temperature of the water in the heater $a$ and consequently in the steamer 3 is indicated by the thermometer 9, and the corresponding pressure of the steam by means of the gage 10.

The circulation of steam through the heating tube $f$ for heating the water in the supply tank $d$ is as follows: from the riser pipe $b$, the pipe $g$, heating tube $f$, return pipe $s$, back to the bottom of the heater $a$. This flow of steam through the heating tube quickly raises the temperature of the water in the hot water supply tank $d$ since the tube $f$ is constructed of brass and is entirely surrounded by water in the tank $d$. The circulation of steam from the heater $a$ to the steamer 3 is from the riser pipe $b$, supply-pipe 2, and back to the heater by means of the return pipe 4 which is connected with the bottom of the heater $a$, as designated at 5.

Connected with the lower end of the return pipe 4 is a sediment catcher 11.

12 designates the usual draw-off pipe for the heater $a$.

13 designates the hot water supply pipe connected with the upper side of the tank $d$ for supplying hot water to the engine house for bathing and cleaning purposes, and also for house heating, if the same is provided with radiators.

The thermostatic valve $j$ (which is of any approved construction) is provided with a pointer for convenience in setting the same in order to maintain a constant temperature of the water in the heater, supply-tank, and steamer.

Referring now to the construction and operation of the thermostatic valve shown in detail in Fig. 4,—25 designates a passageway in the casting 26 that communicates with the supply-pipe $m$. Leading from this passage-way 25, and at right angles thereto, is a second passage-way, designated by 26', which opens into the space 27. 28 indicates a valve-stem bored out as shown at 29, and its inner end is adapted to be closed by means of the rod 30 which is provided with a conical-shaped end 31, as shown. The stem 28 has an opening 32 which communicates with an opening 33 which leads to the pipe $n$ whereby the city pressure will exert a pressure above the diaphragm 34 of the damper controller or regulator $k$. The stem 28 is provided with an operating handle 35 and a pointer 36 which moves in front of an indicating plate 37 containing the words "Warmer" and "Cooler". 38 designates an element that is threaded into the casting or element containing the openings 25, 26′, and 33, and affords a threaded bearing for the stem 28, as shown at 28′, whereby the bored out opening in the end of the stem 28 is regulated. The expansion and contraction of the tube 38′ by reason of the changes in the temperature of the water contained in the tank $d$ will regulate the amount of opening and closing of the bore 29 in the stem 28 and thus determine the flow from the city main $m$ through the passage-ways 25, 26′, 27, 29, 33, and pipe $n$ to the damper regulator $k$ thus controlling the rate of combustion in the furnace and consequently maintaining the temperature in the tank $d$ at a uniform temperature. The specific construction of the thermostatic valve, however, forms no part of my invention and represents an approved form of such valve now in general use for automatically controlling the temperature in a tank. This thermostatic valve, as will be understood, permits the city pressure to pass from the pipe $m$ to the pipe $n$ for operating the damper-regulator $k$ and damper-lever $o$ which, in turn, control the two doors $r$ and 8 and the pipe damper $c^1$ for maintaining an even rate of combustion and for maintaining the water in the heater $a$ at the correct and uniform temperature which will provide, in turn, a suitable steam pressure at all times in the steamer 3.

In practice, I have found that it is desirable to maintain from five to ten pounds of steam in the steamer's boiler, thus furnishing the engine with a supply of pressure for immediate service in case of a fire alarm being rung in.

Referring to the modification shown in Fig. 3, which operates in substantially the same manner as that described above and is what I term an "auxiliary heater" for installation where the engine house is already supplied with a hot water supply tank: In this system, the tank $12^1$ is much smaller in size and receives the ordinary heating tube $f$ described above. A relief valve $13^1$ in case the pressure in the heating tube or heater rises above the required pressure is also provided. 14 designates a hot water supply tank already installed in the engine house in some convenient place. 15 designates a supply pipe for conveying the hot water from the auxiliary tank $12^1$ to the supply tank 14, and 16 designates the return pipe from the tank 14 back to the auxiliary tank $12^1$, and is shown connected with the lower side of the same. This piping arrangement, as readily understood, provides for circulation through the tanks $12^1$ and 14 so that the water in the supply tank 14 is always kept hot. 17 designates a pipe connected with the pipe 16 and leading from the source of supply as the city main, which permits cold water to enter the tank 14 when hot water is drawn off through the pipe 18, which leads to various parts of the building for supplying hot water wherever required. 19 and 20 designate respectively the supply and return pipes to the steamer 3, the supply pipe 19 being connected to the circulating pipe $b$ in the same manner as shown in Fig. 1. The damper regulator $k$, in this modification, instead of being controlled by the thermostatic valve arrangement shown and described in the other figures, is directly connected to the riser pipe $b$ by means of the pipe 21.

In the operation of the dampers it is readily understood that when the pressure in the heater rises, the damper-regulator $k$ will permit the lever $o$ to fall thus closing the lower door 8 and opening the upper door $r$ at the same time opening the pipe damper $c^1$. In this way the fire in the heater is checked by allowing the external air to enter the door $r$ above the fire and also permit the external air to enter the smoke flue $c$. Should the pressure on the other hand fall, the damper-regulator will cause the lever $o$ to move in the opposite direction, that is the outer end of the same will rise thus opening the lower door 8 and closing the upper door $r$ and the pipe-damper $c^1$.

What I claim, is:—

1. In a system of the class described, a steam fire engine, a heater of the hot water type, dampers therefor, as $c^1$, $r$, and 8, a riser pipe connected to the heater, a hot water supply tank, a heating tube passing therethrough, supply and return pipes connected with the heating tube and the hot water heater proper, supply and return pipes connected to the steam fire engine and heater proper; a thermostatic valve located within the hot water supply tank and influenced by the water in said tank, a damper regulator, a connection between said valve and said damper regulator, means for connecting said damper regulator to said mentioned dampers of the hot water heater, whereby when the water in the supply tank reaches a certain temperature one set of dampers will be regulated in one direction, and when it goes below a certain temperature the other set of dampers will be regulated in the opposite direction, whereby a uniform temperature of the water and pressure of steam in the boiler of a steam fire engine may be maintained.

2. In a system of the class described, a heater of the hot water type provided with upper and lower doors as $r$ and 8, a smoke flue, a damper as 24 in said flue, a riser pipe connected to the heater, a hot water supply tank, a heating tube extending through the same, a steam fire engine boiler supply and return pipes, connected to the boiler of a steam fire engine and to the riser pipe and base of the heater, supply and return pipes connected respectively with the riser pipe and the base of said heater and to the heating tube, a damper regulator of the diaphragm type, a thermostatic valve located within the supply tank and influenced by the water in said tank, a pipe connected with the city pressure or source of supply and the thermostatic valve, a pipe connection extending from the thermostatic valve to the damper-regulator, lever mechanism connecting the damper in the smoke-flue and the upper and lower doors of the heater with said damper regulator, whereby substantially a constant temperature of the water is maintained in the heater, tank, and the boiler of the said engine.

3. In a system of the class described, a heater of the hot water type provided with the upper and lower doors, as $r$ and 8, and a smoke-flue, a damper therein, a riser pipe connected to the heater, a portable steamer or fire engine, a supply tank, a heating tube extending through the same, supply and return pipes for the steamer and connected respectively with the riser pipe and the base of the heater, a damper-regulator of the diaphragm type, a thermostatic valve located within the supply tank, a pipe connected with the city pressure and the thermostatic valve, a pipe extending from the thermostatic valve to the damper-regulator, and lever mechanism connecting the smoke-flue damper, said damper regulator, and the upper and lower doors of the heater, a supply pipe connected to the riser pipe and the boiler of the steamer or fire engine; and a return pipe connected to the steamer and the base of the heater proper, whereby a constant pressure of steam is maintained in the steamer, as described.

JAMES A. FLYNN.

Witnesses:
WILLIAM P. BUCKLEY,
R. O. DWIGHT.